United States Patent
Inukai

(10) Patent No.: US 8,472,832 B2
(45) Date of Patent: Jun. 25, 2013

(54) MULTIPLE-OUTPUT POWER SUPPLY UNIT AND IMAGE FORMING APPARATUS HAVING THE POWER SUPPLY UNIT

(75) Inventor: Katsumi Inukai, Iwakura (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 264 days.

(21) Appl. No.: 12/887,727

(22) Filed: Sep. 22, 2010

(65) Prior Publication Data

US 2011/0158674 A1 Jun. 30, 2011

(30) Foreign Application Priority Data

Dec. 28, 2009 (JP) ................................. 2009-297215

(51) Int. Cl.
*G03G 15/00* (2006.01)
*G03G 21/00* (2006.01)

(52) U.S. Cl.
USPC ................. 399/88; 399/71; 399/98; 399/343

(58) Field of Classification Search
USPC ................... 399/37, 88, 71, 98, 99, 100, 101, 399/343, 357; 363/20
See application file for complete search history.

(56) References Cited

U.S. PATENT DOCUMENTS

| | | | |
|---|---|---|---|
| 5,703,765 A | 12/1997 | Preis | |
| 7,809,293 B2 | 10/2010 | Inukai | |
| 2003/0039495 A1 | 2/2003 | Takami et al. | |
| 2003/0185582 A1 | 10/2003 | Inukai | |
| 2005/0019052 A1* | 1/2005 | Claassen | 399/88 |
| 2005/0219868 A1 | 10/2005 | Inukai | |
| 2008/0056740 A1 | 3/2008 | Inukai | |

FOREIGN PATENT DOCUMENTS

| | | |
|---|---|---|
| JP | 62-125916 U | 8/1987 |
| JP | 05-094120 | 4/1993 |
| JP | 07-087667 A | 3/1995 |
| JP | 08-076567 A | 3/1996 |
| JP | 09-134104 | 5/1997 |
| JP | 09-191563 A | 7/1997 |

(Continued)

OTHER PUBLICATIONS

JP Office Action dtd Nov. 15, 2011, JP Appln. 2009-297215, partial English Translation.

(Continued)

*Primary Examiner* — Sophia S Chen
(74) *Attorney, Agent, or Firm* — Banner & Witcoff, Ltd.

(57) ABSTRACT

A multiple-output power supply unit includes: a transformer including: a primary winding; and a secondary winding which has a first node and a second node and which generates a secondary-side voltage at the secondary winding; first output terminal to output a first voltage corresponding to the secondary-side voltage; a first constant voltage element; a current limiting resistor; a second constant voltage element; a second output terminal to output a second voltage different from the first voltage; a current generation circuit provided between the first node and the ground so as to cause a predetermined current to flow between the first node and the ground; a transformer driver circuit connected to the primary winding so as to drive the transformer; and a secondary-side voltage control circuit that controls the transformer driver circuit so as to generate the secondary-side voltage having a predetermined value at the first node.

9 Claims, 5 Drawing Sheets

FOREIGN PATENT DOCUMENTS

| | | |
|---|---|---|
| JP | 10-319808 | 12/1998 |
| JP | 2003-066798 | 3/2003 |
| JP | 2003-295718 | 10/2003 |
| JP | 2008-058481 A | 3/2008 |
| JP | 2009-163006 | 7/2009 |

OTHER PUBLICATIONS

JP Office Action dated Jan. 31, 2012; corresponding Application No. 2009-297215; English Translation.

Extended EP Search Report dtd Apr. 19, 2011, EP Appln. 10251614.3-2207.

Forster et al., "Theoretical design and implementation of a transcutaneous multichannel stimulator for neural prosthesis applications," J. Biomedical Engineering, vol. 3, No. 2, Apr. 1, 1981, pp. 107-120.

Notification of First Office Action for Chinese patent application 201010505480.9 mailed Feb. 16, 2013.

EP Office Action mailed Apr. 5, 2013, EP Appln. 10 251 614.3-1804.

* cited by examiner

|  | TONER ATTRACTION MODE (V) | TONER DISCHARGE AND PAPER DUST ATTRACTION MODE (V) |
|---|---|---|
| ZD1 ZENER VOLTAGE VZD1 (V) | 200 | 200 |
| ZD2 ZENER VOLTAGE VZD2 (V) | 300 | 300 |
| DCLNB (V) [FIRST NODE VOLTAGE VT(+)] | 100 | 800 |
| DCLNA (V) | -100 | 600 |
| VOLTAGE DIFFERENCE (V) DCLNB−DCLNA | 200 | 200 |

\* REQUIREMENTS: DCLNB > 0
VT(−) < DCLNA (−VZD1 < DCLNB−VZD2)

| | TONER ATTRACTION MODE (1) | TONER ATTRACTION MODE (2) | TONER DISCHARGE AND PAPER DUST ATTRACTION MODE |
|---|---|---|---|
| | (V) | (V) | (V) |
| ZD1 ZENER VOLTAGE VZD1 (V) | 100 | 100 | 100 |
| ZD2 ZENER VOLTAGE VZD2 (V) | 300 | 300 | 300 |
| ZD3 ZENER VOLTAGE VZD3 (V) | 200 | 200 | 200 |
| FIRST NODE VOLTAGE VT(+) (V) | 100 | 200 | 800 |
| DCLNB (V) | -100 | 0 | 600 |
| DCLNA (V) | -200 | -100 | 500 |
| VOLTAGE DIFFERENCE (V) DCLNB−DCLNA | 100 | 100 | 100 |

\* REQUIREMENTS: VT(+) > 0
VT(−) < DCLNA (VT(−) < VT(+)−VDZ3−VDZ2)

MULTIPLE-OUTPUT POWER SUPPLY UNIT AND IMAGE FORMING APPARATUS HAVING THE POWER SUPPLY UNIT

CROSS REFERENCE TO RELATED APPLICATION

The present application claims priority from Japanese Patent Application No. 2009-297215, which was filed on Dec. 28, 2009, the disclosure of which is herein incorporated by reference in its entirety.

TECHNICAL FIELD

The apparatuses and devices consistent with the present invention relate to a multiple-output power supply unit and an image forming apparatus having the power supply unit, and more particularly, to a power supply technique of outputting a plurality of voltages having different voltage polarities.

BACKGROUND

A technique related to a power supply that outputs a plurality of voltages having different voltage polarities is disclosed. Specifically, the related art discloses a technique of generating a plurality of positive and negative output voltages using a plurality of transformers.

SUMMARY

However, although the related art technique can appropriately generate and output a plurality of different voltages, since different transformers are used in accordance with the polarity (positive/negative) of the generated voltage, it is difficult to decrease the size of a power supply. Therefore, there is a demand for a multiple-output power supply unit which can be made in a small size and can output a plurality of voltages having different polarities.

The present invention aims to provide a technique for realizing a multiple-output power supply unit capable of outputting a plurality of voltages having different polarities with a simple configuration, and enabling miniaturization of the multiple-output power supply unit.

According to an illustrative aspect of the present invention, there is provided a multiple-output power supply unit comprising: a transformer that includes: a primary winding; and a secondary winding which has a first node and a second node and which generates a secondary-side voltage at the secondary winding; a first output terminal that is connected to the first node so as to output a first voltage corresponding to the secondary-side voltage; a first constant voltage element that is connected to the first output terminal; a current limiting resistor that is provided between the first constant voltage element and the second node; a second constant voltage element that is provided between the second node and a ground; a second output terminal that is connected between the first constant voltage element and the current limiting resistor so as to output a second voltage different from the first voltage; a current generation circuit that is provided between the first node and the ground so as to cause a predetermined current to flow between the first node and the ground by the secondary-side voltage; a transformer driver circuit that is connected to the primary winding so as to drive the transformer; and a secondary-side voltage control circuit that controls the transformer driver circuit so as to generate the secondary-side voltage having a predetermined value at the first node.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

<First Embodiment>

A first embodiment of the present invention will be described with reference to FIGS. 1 to 4.

1. General Configuration of Printer

Figure 1:
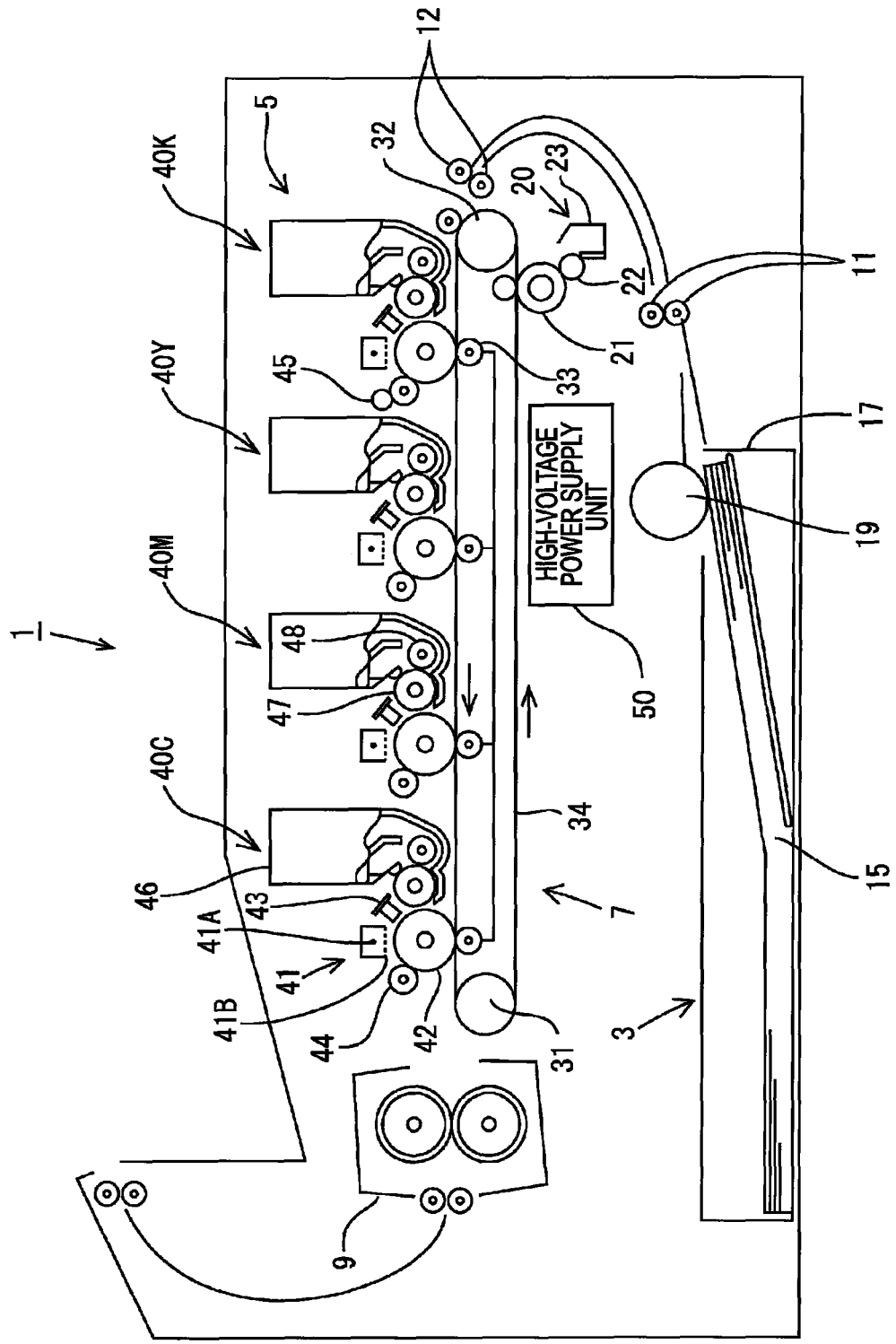
FIG. 1 is a schematic sectional diagram showing an inner configuration of a printer according to a first embodiment of the present invention.

FIG. 1 is a schematic sectional diagram showing an inner configuration of a color printer 1 (an example of an "image forming apparatus having a multiple-output power supply unit" of the present invention) of this embodiment. In the following description, when there is a need to distinguish constituent elements based on their colors, letters representing their colors such as Y (yellow), M (magenta), C (cyan), and K (black) are added to the end of the reference numerals of the respective constituent elements, but otherwise, such letters will not be added. It should be noted that the image forming apparatus is not limited to a color printer, but for example, may be a multi-function product having the functions of a FAX and a copier.

The color printer (hereinafter simply referred to as "printer") 1 includes a sheet feeding unit 3, an image forming portion 5, a transport mechanism 7, a fixing unit 9, a belt cleaning unit 20, and a high-voltage power supply unit 50. The printer 1 forms toner images made up of toner (developer) having one or plural colors (in this embodiment, the toner has four colors which are yellow, magenta, cyan, and black) on a sheet 15 (paper sheet, OHP sheet or such like) in accordance with image data input from an external device, for example.

The sheet feeding unit 3 is provided at the lowermost part of the printer 1 and includes a tray 17 that stores sheets (an example of a recording medium) 15 and a pickup roller 19. The sheets 15 stored in the tray 17 are sent out by the pickup roller 19 one at a time and conveyed to the transport mechanism 7 by transport rollers 11 and registration rollers 12.

The transport mechanism 7 is a mechanism for transporting the sheets 15 and is detachably attached, for example, to a predetermined attachment portion (not shown) that is formed within the printer 1. The transport mechanism 7 includes a drive roller 31, a driven roller 32, and a belt 34. The belt 34 is stretched between the drive roller 31 and the driven roller 32. When the drive roller 31 rotates, the belt 34 moves in a direction in which a surface facing a photosensitive drum 42 moves from the right to the left in FIG. 1. In this way, the sheet 15, which is transported from the registration rollers 12, is transported to be positioned below the image forming portion 5. Moreover, the transport mechanism 7 includes four transfer rollers 33.

The image forming portion (an example of an "image forming unit") 5 includes four process units 40Y, 40M, 40C, and 40K and four exposure devices 43. Each process unit 40 includes a charger 41, a photosensitive drum (an example of an "image carrying member") 42, a drum cleaner roller (an example of an "image carrying member cleaner") 44, a paper dust removal roller (an example of a "paper dust cleaner") 45, a unit casing 46, a developing roller 47, and a supply roller 48. The respective process units 40Y, 40M, 40C, and 40K are detachably attached to a predetermined attachment portion (not shown) that is formed within the printer 1.

The photosensitive drum 42 is formed by forming a positively charged photosensitive layer on a base material made from aluminum, for example, and the aluminum base material is grounded to a ground line of the printer 1. The charger 41 is a scorotron-type charger, for example, and has a discharge wire 41A and a grid 41B. A charge voltage CHG is applied to the discharge wire 41A, and a grid voltage GRID of the grid 41B is controlled so that the surface of the photosensitive drum 42 is substantially at the same potential (for example, +700 V).

The exposure device 43 has a plurality of light-emitting elements (for example, LEDs) arranged in a line, for example, along the direction of the rotation axis of the photosensitive drum 42. The plurality of light-emitting elements are controlled to emit light in accordance with image data input from an external device, whereby electrostatic latent images are formed on the surface of the photosensitive drum 42. The exposure device 43 is installed in a fixed position inside the printer 1. The exposure device 43 may be one that uses a laser.

The unit casing 46 accommodates toner of each color (in this embodiment, positively charged non-magnetic mono-component toner is used, for example) and includes the developing roller 47 and the supply roller 48. The toner is supplied to the developing roller 47 by rotation of the supply roller 48 and frictionally charged with positive charges between the supply roller 48 and the developing roller 47. In addition, the developing roller 47 develops electrostatic latent images by supplying the toner onto the photosensitive drum 42 as a uniformly thin layer, whereby toner images are formed on the photosensitive drum 42.

The respective transfer rollers 33 are disposed at positions such that the belt 34 is interposed between the respective photosensitive drums 42 and the transfer roller 33. The respective transfer rollers 33 transfer the toner images formed on the photosensitive drums 42 to the sheet 15 in response to application of a transfer voltage TRCC which is applied between the transfer rollers 33 and the photosensitive drums 42 and which has a polarity (in this case, a negative polarity) opposite to the charged polarity of the toner. After that, the transport mechanism 7 transports the sheet 15 to the fixing unit 9 where the toner images are thermally fixed, and the sheet 15 is discharged to the top surface of the printer 1.

The drum cleaner roller 44 and the paper dust removal roller 45 constitute a drum cleaning mechanism that attracts and removes adhering material (toner and paper dust) on the photosensitive drum 42 by electrostatic force. The drum cleaning mechanism has two operation modes for removing the toner having a positive polarity and the paper dust having a negative polarity. The two operation modes include a toner attraction mode which is executed during printing (during the passage of a sheet) and a toner discharge and paper dust attraction mode which is executed after a print job is completed and after a predetermined number of sheets are printed (during non-passage of a sheet). In this example, it should be noted that the paper dust removal roller 45 is provided only in the process unit 40K.

During the toner attraction mode, toner is attracted from the photosensitive drum 42 to the drum cleaner roller 44. On the other hand, during the toner discharge and paper dust attraction mode, the toner which was once attracted to the drum cleaner roller 44 is discharged to the photosensitive drum 42, and the paper dust is attracted from the photosensitive drum 42 to the paper dust removal roller 45 by the drum cleaner roller 44. The toner discharged to the photosensitive drum 42 is attracted and collected by the developing roller 47, for example.

Moreover, the belt cleaning unit 20 is provided below the transport mechanism 7 and detachably attached to a predetermined attachment portion (not shown). The belt cleaning unit 20 includes a belt cleaning roller 21, an adhering material collection roller 22, and a collecting box 23 and collects adhering material on the belt 34 (mainly, toner remaining on the belt 34).

2. Configuration of High-Voltage Power Supply Unit

Figure 2:
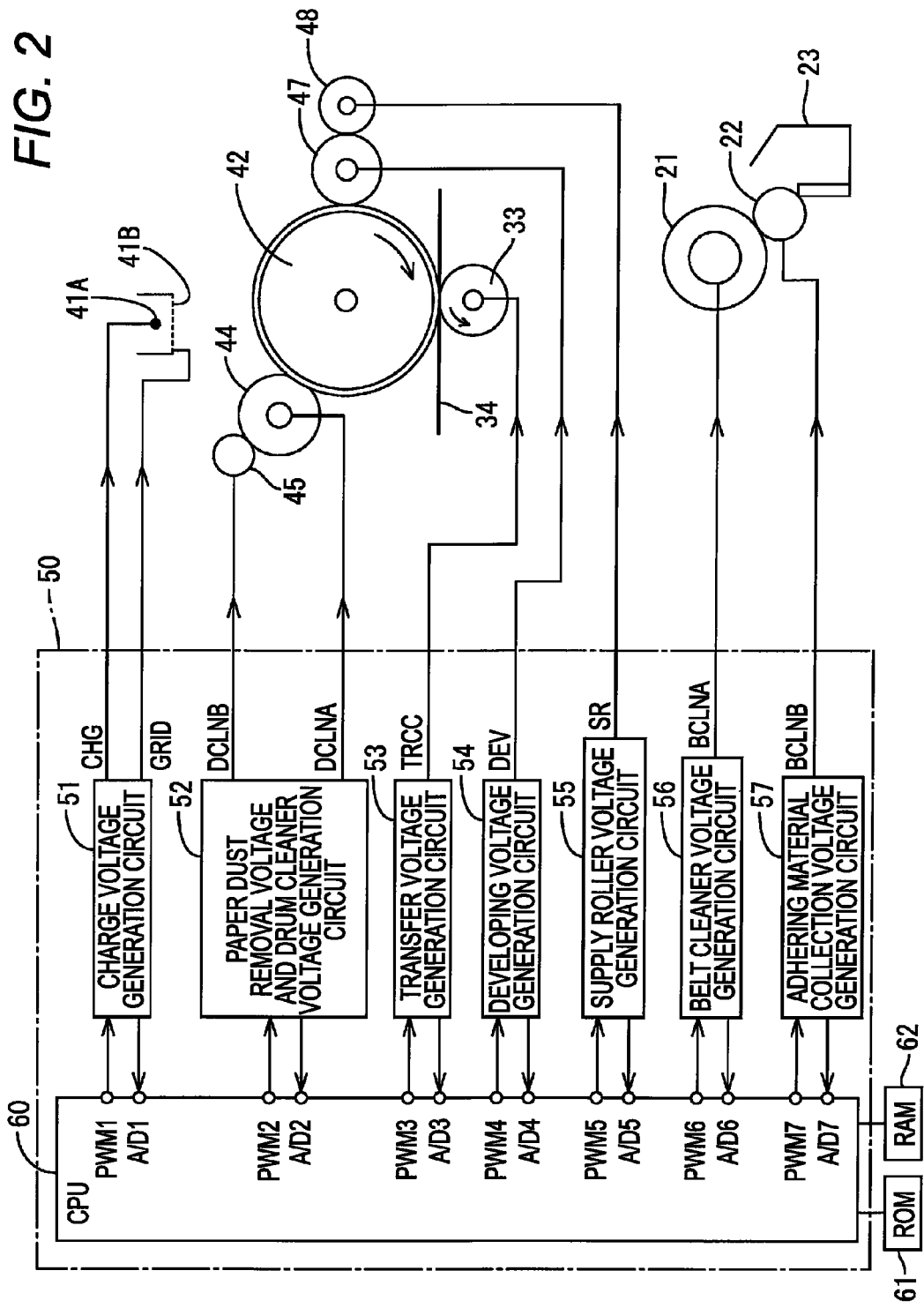
FIG. 2 is a schematic block diagram of a high-voltage power supply unit of the printer.

Next, an electrical configuration related to the present invention, of the printer 1 will be described with reference to FIG. 2. FIG. 2 is a schematic block diagram of the high-voltage power supply unit 50 mounted on a circuit board (not shown) and shows a connection configuration related to the high-voltage power supply unit 50. Although the high-voltage power supply unit 50 includes voltage generation circuits corresponding to the respective process units 40Y, 40M, 40C, and 40K, since the configurations corresponding to the respective process units are substantially the same, only the voltage generation circuit related to the process unit 40K is shown in FIG. 2.

The high-voltage power supply unit (an example of a "multiple-output power supply unit") 50 includes a CPU 60, a plurality of voltage generation circuits connected to the CPU 60, a ROM 61, and a RAM 62. The CPU 60 controls an overall operation of the printer 1 as well as the operations of the voltage generation circuits. The ROM 61 stores a program or the like for controlling an overall operation of the printer 1, and the RAM 62 stores image data or the like used for a printing process.

As shown in FIG. 2, the plurality of voltage generation circuits includes, for example, a charge voltage generation circuit 51, a paper dust removal voltage and drum cleaner voltage generation circuit 52, a transfer voltage generation circuit 53, a developing voltage generation circuit 54, a supply roller voltage generation circuit 55, a belt cleaner voltage generation circuit 56, and an adhering material collection voltage generation circuit 57. However, the configuration of the plurality of voltage generation circuits is not limited to this.

The charge voltage generation circuit 51 generates the charge voltage CHG applied to the discharge wire 41A of the charger 41 and the grid voltage GRID applied to the grid 41B of the charger 41. Here, the charge voltage CHG is 5.5 kV to 8 kV (positive polarity), for example, and the grid voltage GRID is about 700 V (positive polarity), for example. The grid voltage GRID is generated, for example, by dividing the charge voltage CHG with a discharge resistance which appears during discharge between the discharge wire 41A and the grid 41B and a voltage-dividing resistor which is provided in the charge voltage generation circuit 51.

For example, the charge voltage generation circuit 51 generates the charge voltage CHG in accordance with a PWM signal from a PWM1 port of the CPU 60, and the charge voltage CHG is feedback-controlled through an A/D1 port.

The paper dust removal voltage and drum cleaner voltage generation circuit 52 generates a paper dust removal voltage DCLNB applied to the paper dust removal roller 45 and a drum cleaner voltage DCLNA applied to the drum cleaner roller 44. Here, the paper dust removal voltage DCLNB is about 100 V (positive polarity), for example, during the toner attraction mode and is about 800 V (positive polarity), for example, during the toner discharge and paper dust attraction mode (see FIG. 4).

Figures 3, 4:
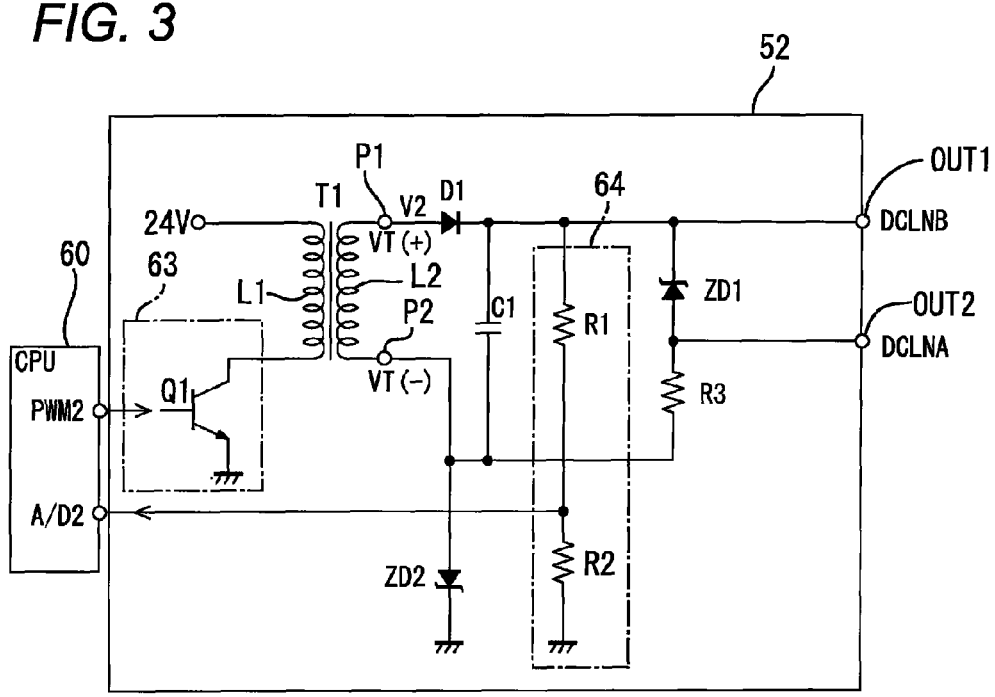
FIG. 3 is a schematic block diagram of a paper dust removal voltage and drum cleaner voltage generation circuit according to the first embodiment.
FIG. 4 is a table showing the relationship of various voltages in the first embodiment.

Moreover, the drum cleaner voltage DCLNA is about −100 V (negative polarity), for example, during the toner attraction mode and is about 600 V (positive polarity), for example, during the toner discharge and paper dust attraction mode (see FIG. 4). The paper dust removal voltage and drum cleaner voltage generation circuit 52 generates the paper dust removal voltage DCLNB in accordance with a PWM signal from a PWM2 port of the CPU 60 and generates the drum cleaner voltage DCLNA based on the paper dust removal voltage DCLNB. The paper dust removal voltage DCLNB is feedback-controlled through an A/D2 port. The details of the paper dust removal voltage and drum cleaner voltage generation circuit 52 will be described later.

The transfer voltage generation circuit 53 generates the transfer voltage TRCC applied to the transfer roller 33. Here, the transfer voltage TRCC is about −7 kV (negative polarity), for example. For example, the transfer voltage generation circuit 53 generates the transfer voltage TRCC in accordance with a PWM signal from a PWM3 port of the CPU 60, and the transfer voltage TRCC is feedback-controlled through an A/D3 port.

The developing voltage generation circuit 54 generates a developing voltage DEV applied to the developing roller 47. Here, the developing voltage DEV is about 400 to 550 V (positive polarity), for example. For example, the developing voltage generation circuit 54 generates the developing voltage DEV in accordance with a PWM signal from a PWM4 port of the CPU 60, and the developing voltage DEV is feedback-controlled through an A/D4 port.

The supply roller voltage generation circuit 55 generates a supply roller voltage SR applied to the supply roller 48. Here, the supply roller voltage SR is about 500 to 650 V (positive polarity), for example. For example, the supply roller voltage generation circuit 55 generates the supply roller voltage SR in accordance with a PWM signal from a PWM5 port from the CPU 60, and the supply roller voltage SR is feedback-controlled through an A/D5 port.

The belt cleaner voltage generation circuit 56 generates a belt cleaner voltage BCLNA applied to the belt cleaner roller 21. Here, the belt cleaner voltage BCLNA is about −1200 V (negative polarity), for example. For example, the belt cleaner voltage generation circuit 56 generates the belt cleaner voltage BCLNA in accordance with a PWM signal from a PWM6 port of the CPU 60, and the belt cleaner voltage BCLNA is feedback-controlled through an A/D6 port.

The adhering material collection voltage generation circuit 57 generates an adhering material collection voltage BCLNB applied to the adhering material collection roller 22. Here, the adhering material collection voltage BCLNB is about −1600 V (negative polarity), for example. For example, the adhering material collection voltage generation circuit 57 generates the adhering material collection voltage BCLNB in accordance with a PWM signal from a PWM7 port of the CPU 60, and the adhering material collection voltage BCLNB is feedback-controlled through an A/D7 port.

3. Configuration of Paper Dust Removal Voltage and Drum Cleaner Voltage Generation Circuit Next, the paper dust removal voltage and drum cleaner voltage generation circuit 52 will be described with reference to FIGS. 3 and 4. FIG. 3 is a schematic block diagram of the paper dust removal voltage and drum cleaner voltage generation circuit 52, and FIG. 4 is a table showing examples of various voltages during the toner attraction mode and the toner discharge and paper dust attraction mode. In FIG. 4, the following two conditions should be satisfied, which are "[Paper Dust removal Voltage DCLNB]>0" and "[Second node Voltage VT(−)]<[Drum Cleaner Voltage DCLNA]".

The paper dust removal voltage and drum cleaner voltage generation circuit 52 includes a transformer T1, a rectification diode D1, a first Zener diode (an example of a "first constant voltage element") ZD1, a first output terminal OUT1, a second Zener diode (an example of a "second constant voltage element") ZD2, a second output terminal OUT2, a current limiting resistor R3, a transformer driver circuit 63, and a secondary-side voltage detecting circuit 64.

The transformer T1 includes a primary winding L1 and a secondary winding L2 having a first node P1 and a second node P2 and generates a secondary-side voltage V2 at the secondary winding L2.

The rectification diode D1 rectifies an alternating-current voltage generated at the first node P1 and generates the secondary-side voltage V2 by smoothing the rectified voltage with a capacitor C1. In this embodiment, it will be assumed that the value (maximum) of the alternating-current voltage generated at the first node P1 (hereinafter, the value will be referred to as "first node voltage VT(+)") is equal to the secondary-side voltage V2, and a voltage drop by the rectification diode D1 will be ignored.

The first output terminal OUT1 is connected to the first node P1 of the secondary winding L2, specifically through the rectification diode D1, so as to output the paper dust removal voltage DCLNB (an example of "first voltage") corresponding to the secondary-side voltage V2 to the paper dust removal roller 45.

A cathode of the first Zener diode ZD1 is connected to the first output terminal OUT1, and an anode of the first Zener diode ZD1 is connected to one end of the current limiting resistor R3. On the other hand, an anode of the second Zener diode ZD2 is connected to the second node P2 of the second winding L2, and a cathode of the second Zener diode ZD2 is connected to the ground.

The current limiting resistor R3 is provided between the first Zener diode ZD1 and the second node P2 of the second winding L2 so as to limit the current flowing through the first Zener diode ZD1.

The second output terminal OUT2 is connected between the anode of the first Zener diode ZD1 and one end of the current limiting resistor R3 so as to output the drum cleaner voltage DCLNA (an example of "second voltage") different from the paper dust removal voltage DCLNB to the drum cleaner roller 44. A difference between the paper dust removal voltage DCLNB and the drum cleaner voltage DCLNA corresponds to a Zener voltage VZD1 of the first Zener diode ZD1.

The secondary-side voltage detecting circuit 64 is provided between the first node P1 of the second winding L2 and the ground so as to detect the value of the secondary-side voltage V2. The secondary-side voltage detecting circuit 64 includes, for example, voltage-dividing resistors R1 and R2 as shown in FIG. 3, and supplies a divided voltage value (detected value) of the secondary-side voltage V2 divided by the voltage-dividing resistors R1 and R2 to the A/D2 port of the CPU 60.

Moreover, the secondary-side voltage detecting circuit (an example of a "current generation circuit") 64 causes a predetermined current to flow between the first node P1 of the secondary winding L2 and the ground through the voltage-dividing resistors R1 and R2 by the secondary-side voltage V2. The predetermined current from the first node P1 of the secondary winding L2 returns to the second node P2 of the secondary winding L2 through the ground and the second Zener diode ZD2. Thus, a current necessary for the Zener diode ZD2 to generate a predetermined voltage is allowed to flow through the Zener diode ZD2, and the voltage (hereinafter referred to as "second node voltage VT(−)") of the second node P2 becomes a predetermined negative voltage.

In this example, the secondary-side voltage detecting circuit 64 constituted by the voltage-dividing resistors R1 and R2 can serve also as the current generation circuit that causes the predetermined current to flow between the first node P1 of the secondary winding L2 and the ground according to the secondary-side voltage V2. Thus, it is not necessary to provide an additional current generation circuit.

The transformer driver circuit 63 is connected to the primary winding L1 so as to drive the transformer T1. The transformer driver circuit 63 includes a transistor Q1 as shown in FIG. 3. The transistor Q1 is turned on and off in accordance with the PWM signal from the PWM2 port of the CPU 60 so as to drive the primary winding L1.

The CPU (an example of a "secondary-side voltage control circuit") 60 sets the value of the secondary-side voltage V2. The CPU 60 performs setting of the voltage value (corresponding to "predetermined value" in the present invention) of the secondary-side voltage V2 in accordance with a command from a program related to a printing process, for example. It should be noted that the method of setting the value of the secondary-side voltage V2 is not limited to this. The transformer driver circuit 63 is subjected to feedback control based on the value detected by the secondary-side voltage detecting circuit 64 so that the secondary-side voltage V2 having the set value is generated at the first node P1 of the secondary winding L2.

4. Operation and Advantage of First Embodiment

According to the connection configuration of the first and second Zener diodes ZD1 and ZD2, by appropriately selecting the Zener voltages VZD1 and VZD2 of the first and second Zener diodes ZD1 and ZD2 to appropriately set the value of the secondary-side voltage V2, it is possible to generate the paper dust removal voltage DCLNB (first voltage) having positive polarity and the drum cleaner voltage DCLNA (second voltage) having negative polarity.

For example, as shown in FIG. 4, the first and second Zener diodes ZD1 and ZD2 being used have Zener voltages VZD1 and VZD2 which are 200 V and 300 V, respectively. Therefore, during the toner attraction mode, when the secondary-side voltage V2 is set to 100 V, the paper dust removal voltage DCLNB of about 100 V (positive polarity) and the drum cleaner voltage DCLNA of about −100 V (negative polarity) are obtained as shown in FIG. 4.

At that time, the voltage difference between the paper dust removal voltage DCLNB and the drum cleaner voltage DCLNA becomes 200 V which corresponds to the Zener voltage VZD1 of the first Zener diode ZD1. That is, the paper dust removal voltage DCLNB is 200 V higher than the drum cleaner voltage DCLNA. Therefore, the toner having positive polarity is appropriately attracted to the drum cleaner roller 44 having negative polarity and remains on the drum cleaner roller 44 without being moved to the paper dust removal roller 45.

Moreover, in this case, the second node voltage VT(−) of the secondary winding L2 becomes −300 V due to the Zener voltage VZD2 of the second Zener diode ZD2. Thus, a voltage drop due to the current limiting resistor R3 is 200 V.

That is, it is possible to output two voltages (DCLNB and DCLNA: 100 V and −100 V) having different polarities using one transformer T1. Therefore, it is possible to decrease the size of the high-voltage power supply unit 50 that outputs a plurality of voltages having different polarities.

On the other hand, during the toner discharge and paper dust attraction mode, when the secondary-side voltage V2 is set to 800 V, the paper dust removal voltage DCLNB of about 800 V and the drum cleaner voltage DCLNA of about 600 V are obtained as shown in FIG. 4. That is, in this case, the paper dust removal voltage DCLNB and the drum cleaner voltage DCLNA which both have a positive polarity are obtained.

At that time, similarly, the voltage difference between the paper dust removal voltage DCLNB and the drum cleaner voltage DCLNA becomes 200 V, which corresponds to the Zener voltage VZD1 of the first Zener diode ZD1. That is, the paper dust removal voltage DCLNB is 200 V higher than the drum cleaner voltage DCLNA. Moreover, since the drum cleaner voltage DCLNA (800 V) is higher than the voltage of the photosensitive drum 42, the toner is appropriately discharged to the photosensitive drum 42. On the other hand, the paper dust having negative polarity is appropriately attracted to the paper dust removal roller 45 by the drum cleaner roller 44.

In this case, in a configuration in which two voltages having different polarities can be output by one transformer T1, it is possible to output two voltages (DCLNB and DCLNA: 100 V and −100 V) which both have a positive polarity as necessary.

In this way, according to the first embodiment, it is possible to appropriately generate four kinds of voltages necessary during the toner attraction mode and the toner discharge and paper dust attraction mode using one transformer T1 based on the setting of the secondary-side voltage V2.

<Second Embodiment>

Figures 5, 6:
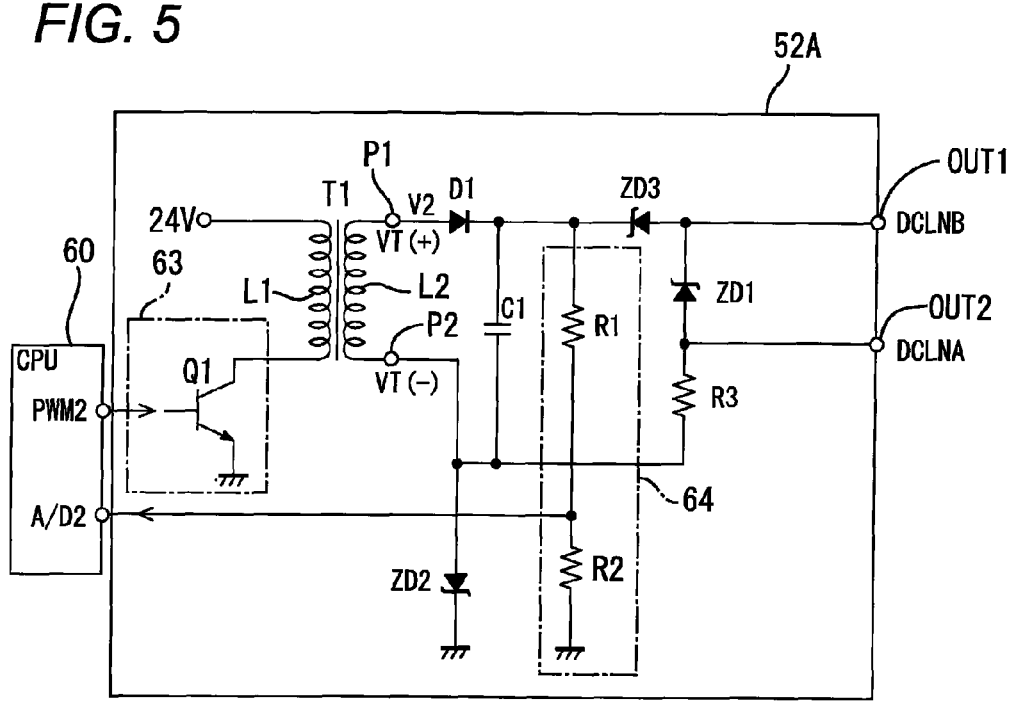
FIG. 5 is a schematic block diagram of a paper dust removal voltage and drum cleaner voltage generation circuit according to a second embodiment.
FIG. 6 is a table showing the relationship of various voltages in the second embodiment.

Next, a second embodiment of the present invention will be described with reference to FIGS. 5 and 6. FIG. 5 is a schematic block diagram of a paper dust removal voltage and drum cleaner voltage generation circuit 52A of the second embodiment, and FIG. 6 is a table showing examples of various voltages in the second embodiment during the toner attraction mode and the toner discharge and paper dust attraction mode. In FIG. 6, the following two conditions should be satisfied, which are "[First Node Voltage VT(+)]>0" and "[Second Node Voltage VT(−)]<[Drum Cleaner Voltage DCLNA]".

The first and second embodiments are partially different in the configuration of the paper dust removal voltage and drum cleaner voltage generation circuit. Thus, the same constituent elements will be denoted by the same reference numerals, and only the different points will be described.

The paper dust removal voltage and drum cleaner voltage generation circuit 52A is further provided with a third Zener diode ZD3 (an example of a "third constant voltage element") between the rectification diode D1 and the first Zener diode ZD1, as shown in FIG. 5.

That is, the third Zener diode ZD3 is provided between the first node P1 of the secondary winding L2 and the first Zener diode ZD1. Specifically, an anode of the third Zener diode ZD3 is connected to the first output terminal OUT1, and a cathode of the third Zener diode ZD3 is connected to the first node P1 of the secondary winding L2 through the rectification diode D1. Moreover, the first output terminal OUT1 is connected between the first Zener diode ZD1 and the third Zener diode ZD3.

5. Operation and Advantage of Second Embodiment

According to the connection configuration of the first to third Zener diodes (ZD1, ZD2, and ZD3), by appropriately selecting the Zener voltages VZD1, VZD2, and VZD3 of the first to third Zener diodes ZD1, ZD2, and ZD3 to appropriately set the value of the secondary-side voltage V2, it is possible to generate the paper dust removal voltage DCLNB (first voltage) having a higher negative potential compared to the first embodiment.

For example, as shown in FIG. 6, the first, second, and third Zener diodes ZD1, ZD2, and ZD3 being used have Zener voltages VZD1, VZD2, and VZD3 which are 100 V, 300 V, and 200 V, respectively. Therefore, during the toner attraction mode(1), when the secondary-side voltage V2 (first node voltage VT(+)) is set to 100 V, the paper dust removal voltage DCLNB of about −100 V and the drum cleaner voltage DCLNA of about −200 V are obtained as shown in FIG. 6. In this case, a voltage drop due to the current limiting resistor R3 is 100 V.

At that time, the voltage difference between the paper dust removal voltage DCLNB and the drum cleaner voltage DCLNA becomes 100 V which corresponds to the Zener voltage VZD1 of the first Zener diode ZD1. That is, the paper dust removal voltage DCLNB is 100 V higher than the drum cleaner voltage DCLNA. Therefore, the toner having positive polarity is appropriately attracted to the drum cleaner roller 44 and remains on the drum cleaner roller 44 without being moved to the paper dust removal roller 45.

That is, in this case, it is possible to output two voltages (DCLNB and DCLNA: −100 V and −100 V) both having negative polarity using one transformer T1.

Moreover, during the toner attraction mode(2), when the secondary-side voltage V2 (first node voltage VT(+)) is set to 200 V, the paper dust removal voltage DCLNB of about 0 V and the drum cleaner voltage DCLNA of about −100 V are obtained as shown in FIG. 6. That is, the paper dust removal voltage DCLNB and the drum cleaner voltage DCLNA each rise by 100 V. A voltage drop due to the current limiting resistor R3 is 200 V. In this case, the paper dust removal voltage DCLNB having positive polarity (also including 0 V) and the drum cleaner voltage DCLNA having negative polarity are obtained.

On the other hand, during the toner discharge and paper dust attraction mode, when the secondary-side voltage V2 is set to 800 V, the paper dust removal voltage DCLNB of about 600 V and the drum cleaner voltage DCLNA of about 500 V are obtained as shown in FIG. 6. A voltage drop due to the current limiting resistor R3 is 800 V. That is, in this case, the paper dust removal voltage DCLNB and the drum cleaner voltage DCLNA which both have a positive polarity are obtained.

At that time, the voltage difference between the paper dust removal voltage DCLNB and the drum cleaner voltage DCLNA becomes 100 V. That is, the paper dust removal voltage DCLNB is 100 V higher than the drum cleaner voltage DCLNA. Therefore, the toner is appropriately discharged to the photosensitive drum 42. On the other hand, the paper dust having negative polarity is appropriately attracted to the paper dust removal roller 45 by the drum cleaner roller 44.

In this way, in addition to the advantage of the first embodiment, it is possible to generate the paper dust removal voltage DCLNB (first voltage) having negative polarity with the third Zener diode ZD3. Thus, the degree of freedom regarding the voltage polarity when generating the paper dust removal voltage DCLNB and the drum cleaner voltage DCLNA, particularly when generating the paper dust removal voltage DCLNB, is increased.

<Other Embodiments>

The present invention is not limited to the embodiments described above and illustrated in the drawings, and for example, the following embodiments are also included in the technical scope of the present invention.

Figure 7:
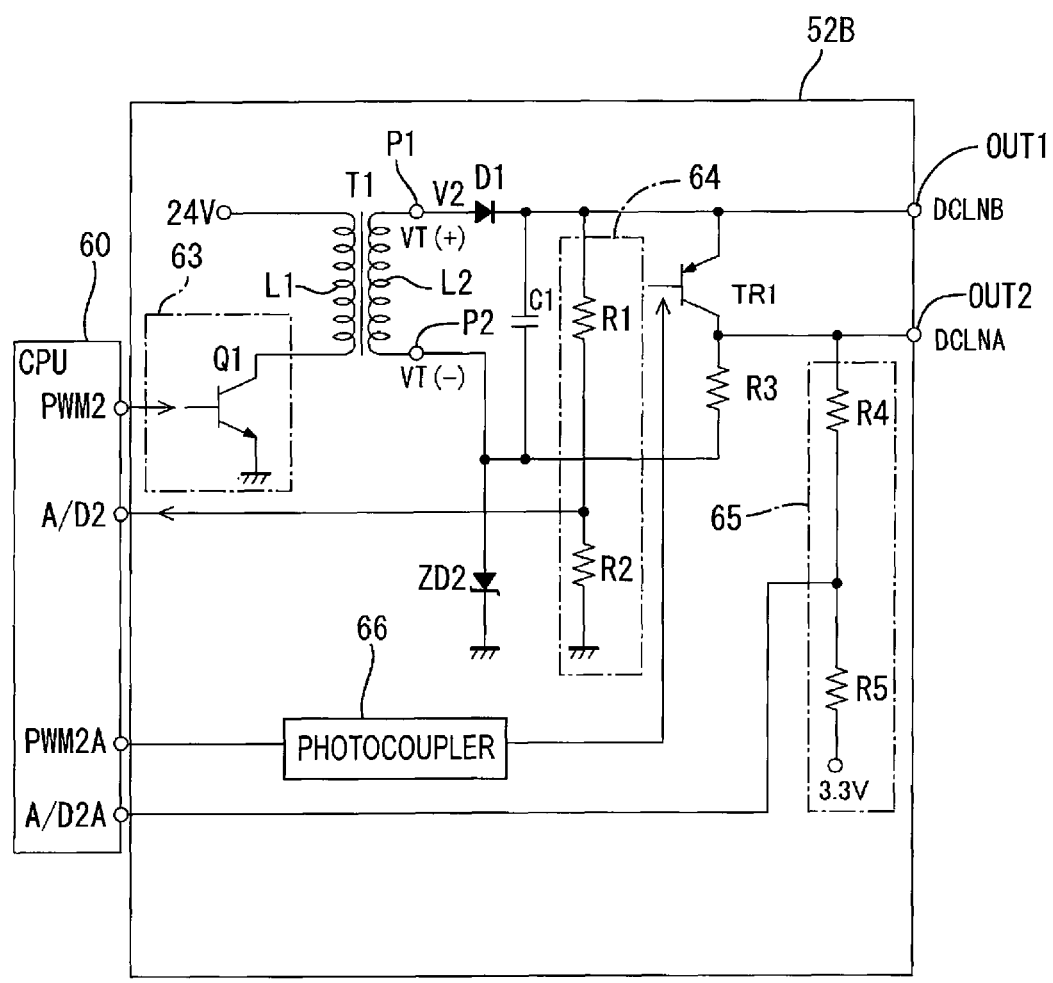
FIG. 7 is a schematic block diagram of a paper dust removal voltage and drum cleaner voltage generation circuit according to another embodiment.

(1) Although the above-described first and second embodiments have described an example where the first Zener diode ZD1 is used as the first constant voltage element, the present invention is not limited to this. For example, as shown in FIG. 7, a transistor TR1 may be used as the first constant voltage element. In this case, the ON resistance of the transistor TR1 is controlled in accordance with an ON resistance control signal supplied to the base (an example of a "control terminal") of the transistor TR1. Therefore, by changing the ON resistance of the transistor TR1 in accordance with the ON resistance control signal, it is possible to appropriately set a voltage drop via the transistor TR1, that is, the voltage difference between the paper dust removal voltage DCLNB (first voltage) and the drum cleaner voltage DCLNA (second voltage).

In this case, for example, the CPU 60 generates the ON resistance control signal as a PWM signal. The ON resistance control signal (PWM signal) is supplied from a PWM2A port to a photocoupler 66, and the base of the transistor TR1 is controlled by the photocoupler 66.

In this case, as shown in FIG. 7, a paper dust removal voltage and drum cleaner voltage generation circuit 52B may further include a second voltage detecting circuit 65 which is connected to the second output terminal OUT2 so as to detect the value of the drum cleaner voltage DCLNA. Moreover, the CPU (an example of a "second voltage control circuit") 60 may generate the ON resistance control signal based on the value detected by the second voltage detecting circuit 65 that is constituted by voltage-dividing resistors R4 and R5 and input A/D2A port, for example. According to this configuration, by subjecting the drum cleaner voltage DCLNA to feedback control using the second voltage detecting circuit 65 and the CPU 60, it is possible to appropriately maintain the second voltage to be a predetermined value.

Although FIG. 7 shows an example where the transistor TR1 is used as the first constant voltage element in the first embodiment shown in FIG. 3, the transistor TR1 may be used as the first constant voltage element in the second embodiment shown in FIG. 5. Moreover, as the second or third constant voltage element, the transistor of which the ON resistance is controlled may be used in place of the Zener diode. Besides, a varistor may be used as the first to third constant voltage elements.

(2) Although the above-described embodiments have described an example where the paper dust removal voltage DCLNB serving as the first voltage and the drum cleaner voltage DCLNA serving as the second voltage are generated by one transformer T1, the present invention is not limited to this. For example, the present invention can be applied to a case where the supply roller voltage SR serving as the first voltage and the developing voltage DEV serving as the second voltage are generated by one transformer T1.

(3) Although the above-described embodiments have described an example where the secondary-side voltage (first node voltage) V2 of the transformer T1 has a positive polarity, the present invention is not limited to this. The present invention can be applied to a case where the secondary-side voltage (first node voltage) V2 of the transformer T1 has a negative polarity. In this case, the connection directions of the first to third Zener diodes (ZD1, ZD2, and ZD3) and the transistor TR1 are reversed from those in the above-described embodiments.

Moreover, the present invention can be applied to a case where when the secondary-side voltage (first node voltage) V2 has a negative polarity, the adhering material collection voltage BCLNB serving as the first voltage and the belt cleaner voltage BCLNA serving as the second voltage are generated by one transformer T1, for example.

Furthermore, the high-voltage power supply unit (multiple-output power supply unit) 50 may have a configuration in which the transformer of which the secondary-side voltage V2 has a positive polarity and another transformer of which the secondary-side voltage V2 has a negative polarity are combined.

(4) The multiple-output power supply unit according to the present invention can be applied to all apparatuses which require a plurality of output voltages, particularly, output voltages having different polarities, without being limited to an image forming apparatus.

According to a first aspect of the exemplary embodiments, there is provided a multiple-output power supply unit comprising: a transformer that includes: a primary winding; and a secondary winding which has a first node and a second node and which generates a secondary-side voltage at the secondary winding; a first output terminal that is connected to the first node so as to output a first voltage corresponding to the secondary-side voltage; a first constant voltage element that is connected to the first output terminal; a current limiting resistor that is provided between the first constant voltage element and the second node; a second constant voltage element that is provided between the second node and a ground; a second output terminal that is connected between the first constant voltage element and the current limiting resistor so as to output a second voltage different from the first voltage; a current generation circuit that is provided between the first node and the ground so as to cause a predetermined current to flow between the first node and the ground by the secondary-side voltage; a transformer driver circuit that is connected to the primary winding so as to drive the transformer; and a secondary-side voltage control circuit that controls the transformer driver circuit so as to generate the secondary-side voltage having a predetermined value at the first node.

According to the connection configuration of the first and second constant voltage elements, for example, Zener diodes are used as the first and second constant voltage elements, and the cathode of a Zener diode corresponding to the second constant voltage element is connected to the ground. Therefore, by appropriately selecting the value of the secondary-side voltage and the Zener voltages of the respective Zener diodes, it is possible to generate the first voltage having a positive polarity and the second voltage having a negative polarity. That is, it is possible to output a plurality of voltages having different polarities using one transformer. Therefore, it is possible to decrease the size of the multiple-output power supply unit that outputs a plurality of voltages having different polarities.

According to the second aspect of the exemplary embodiments, in addition to the first aspect, the multiple-output power supply unit, further comprises: a secondary-side voltage detecting circuit that is provided between the first node and the ground so as to detect the value of the secondary-side voltage, wherein the secondary-side voltage control circuit controls the transformer driver circuit based on the value detected by the secondary-side voltage detecting circuit.

According to this configuration, by subjecting the secondary-side voltage to feedback control using the secondary-side voltage detecting circuit and the secondary-side voltage control circuit, it is possible to appropriately maintain the secondary-side voltage to be a predetermined value. Moreover, when the secondary-side voltage detecting circuit is constituted, for example, by voltage-dividing resistors that detect a divided voltage value of the secondary-side voltage, the secondary-side voltage detecting circuit can serve also as the current generation circuit.

According to the third aspect of the exemplary embodiments, in addition to the first aspect or the second aspect, wherein the first constant voltage element is a first Zener diode, and the second constant voltage element is a second Zener diode, wherein a cathode of the first Zener diode is connected to the first output terminal, and an anode of the first Zener diode is connected to the current limiting resistor, and wherein an anode of the second Zener diode is connected to the second node, and a cathode of the second Zener diode is connected to the ground.

According to this configuration, by appropriately selecting the value of the secondary-side voltage and the Zener voltages of the first and second Zener diodes, it is possible to appropriately generate the first voltage having a positive polarity and the second voltage having a negative polarity with a simple configuration.

According to the fourth aspect of the exemplary embodiments, in addition to the first aspect or the second aspect, wherein the first constant voltage element is a transistor which has a control terminal and of which the ON resistance is controlled in accordance with an ON resistance control signal supplied to the control terminal, wherein the second constant voltage element is a Zener diode, and wherein an anode of the Zener diode is connected to the second node, and a cathode of the Zener diode is connected to the ground.

According to this configuration, by changing the ON resistance of the transistor based on the ON resistance control signal, it is possible to appropriately set a voltage drop via the transistor, that is, the potential difference between the first voltage and the second voltage.

According to the fifth aspect of the exemplary embodiments, in addition to the four aspect, the multiple-output power supply unit further comprises: a second voltage detecting circuit that is connected to the second output terminal so as to detect the value of the second voltage; and a second voltage control circuit that generates the ON resistance control signal based on the value detected by the second voltage detecting circuit.

According to this configuration, by subjecting the second voltage to feedback control using the second voltage detecting circuit and the second voltage control circuit, it is possible to appropriately maintain the second voltage to be a predetermined value.

According to the sixth aspect of the exemplary embodiments, in addition to anyone of the first aspect to the fifth aspect, the multiple-output power supply unit further comprises, a third constant voltage element that is provided between the first node and the first constant voltage element, wherein the first output terminal is connected between the first constant voltage element and the third constant voltage element.

According to this configuration, for example, by using a Zener diode having a predetermined Zener voltage as the third constant voltage element and appropriately setting the value of the secondary-side voltage, it is possible to generate the first voltage having a negative polarity. That is, the degree of freedom regarding the voltage polarity when generating the first voltage and the second voltage, particularly when generating the first voltage is increased.

According to the seventh aspect of the exemplary embodiments, in addition to the sixth aspect, wherein the third constant voltage element is a third Zener diode, wherein an anode of the third Zener diode is connected to the first output terminal, and a cathode of the third Zener diode is connected to the first node.

According to this configuration, by appropriately selecting the value of the secondary-side voltage and the Zener voltage of the third Zener diode, it is possible to appropriately generate the first and second voltages having a desired polarity with a simple configuration.

According to the eighth aspect of the exemplary embodiments, there is provided an image forming apparatus comprising: the multiple-output power supply unit according to anyone of the first aspect to the seventh aspect; and an image forming unit that forms images on a recording medium with a developer image.

In general, a number of high voltages are used in an electrophotographic image forming apparatus. Therefore, according to this configuration, by using a multiple-output power supply unit capable of outputting a plurality of high voltages using one transformer, it is possible to decrease the number and the weight of high-voltage power supply units used in the image forming apparatus. Accordingly, it is possible to realize cost-reduction and weight-reduction of the image forming apparatus.

According to the ninth aspect of the exemplary embodiments, in addition to the eighth aspect, wherein the image forming unit includes: an image carrying member that carries the developer image; an image carrying member cleaner that removes developer remaining on the image carrying member; and a paper dust cleaner that removes paper dust by using the image carrying member cleaner, wherein the first voltage is a paper dust cleaner voltage supplied to the paper dust cleaner, and wherein the second voltage is an image carrying member cleaner voltage supplied to the image carrying member cleaner.

According to this configuration, in the image forming apparatus, removal of developer remaining on the image carrying member and removal of paper dust using the image carrying member can be appropriately performed by a multiple-output power supply unit having one transformer.

According to the present invention, it is possible to realize a multiple-output power supply unit capable of outputting a plurality of voltages having different polarities with a simple configuration and enable miniaturization of the multiple-output power supply unit.

What is claimed is:
1. A multiple-output power supply unit comprising:
a transformer that includes:
a primary winding; and
a secondary winding which has a first node and a second node and which generates a secondary-side voltage at the secondary winding;
a first output terminal that is connected to the first node so as to output a first voltage corresponding to the secondary-side voltage;
a first constant voltage element that is connected to the first output terminal;
a current limiting resistor that is provided between the first constant voltage element and the second node;
a second constant voltage element that is provided between the second node and a ground;
a second output terminal that is connected between the first constant voltage element and the current limiting resistor so as to output a second voltage different from the first voltage;
a current generation circuit that is provided between the first node and the ground so as to cause a predetermined current to flow between the first node and the ground by the secondary-side voltage;
a transformer driver circuit that is connected to the primary winding so as to drive the transformer; and
a secondary-side voltage control circuit configured to control the transformer driver circuit so as to generate the secondary-side voltage having a predetermined value at the first node.

2. The multiple-output power supply unit according to claim 1, further comprising:
a secondary-side voltage detecting circuit that is provided between the first node and the ground so as to detect the value of the secondary-side voltage,
wherein the secondary-side voltage control circuit controls the transformer driver circuit based on the value detected by the secondary-side voltage detecting circuit.

3. The multiple-output power supply unit according to claim 1,
wherein the first constant voltage element is a first Zener diode, and the second constant voltage element is a second Zener diode,
wherein a cathode of the first Zener diode is connected to the first output terminal, and an anode of the first Zener diode is connected to the current limiting resistor, and
wherein an anode of the second Zener diode is connected to the second node, and a cathode of the second Zener diode is connected to the ground.

4. The multiple-output power supply unit according to claim 1,
wherein the first constant voltage element is a transistor which has a control terminal and of which the ON resistance is controlled in accordance with an ON resistance control signal supplied to the control terminal,
wherein the second constant voltage element is a Zener diode, and
wherein an anode of the Zener diode is connected to the second node, and a cathode of the Zener diode is connected to the ground.

5. The multiple-output power supply unit according to claim 4, further comprising:
a voltage detecting circuit that is connected to the second output terminal so as to detect the value of the second voltage; and
a voltage control circuit that generates the ON resistance control signal based on the value detected by the voltage detecting circuit.

6. The multiple-output power supply unit according to claim 1, further comprising,
a third constant voltage element that is provided between the first node and the first constant voltage element,
wherein the first output terminal is connected between the first constant voltage element and the third constant voltage element.

7. The multiple-output power supply unit according to claim 6,
wherein the third constant voltage element is a Zener diode,
wherein an anode of the Zener diode is connected to the first output terminal, and a cathode of the Zener diode is connected to the first node.

8. An image forming apparatus comprising:
the multiple-output power supply unit according to claim 1; and
an image forming unit configured to form images on a recording medium with a developer image.

9. The image forming apparatus according to claim 8,
wherein the image forming unit includes:
- an image carrying member configured to carry the developer image;
- an image carrying member cleaner configured to remove developer remaining on the image carrying member; and
- a paper dust cleaner configured to remove paper dust by using the image carrying member cleaner, wherein the first voltage is a paper dust cleaner voltage supplied to the paper dust cleaner, and
wherein the second voltage is an image carrying member cleaner voltage supplied to the image carrying member cleaner.

* * * * *